(12) United States Patent
Anttonen et al.

(10) Patent No.: US 10,434,886 B2
(45) Date of Patent: Oct. 8, 2019

(54) METHOD AND ARRANGEMENT FOR CHARGING OF VEHICLE ACCUMULATORS

(71) Applicant: AALTO UNIVERSITY FOUNDATION, Aalto Helsinki (FI)

(72) Inventors: Jukka Anttonen, Espoo (FI); Matias Mäenpää, Helsinki (FI)

(73) Assignee: AALTO UNIVERSITY FOUNDATION, Helsinki (FI)

( * ) Notice: Subject to any disclaimer, the term of this patent is extended or adjusted under 35 U.S.C. 154(b) by 0 days.

(21) Appl. No.: 15/620,230

(22) Filed: Jun. 12, 2017

(65) Prior Publication Data

US 2017/0341522 A1 Nov. 30, 2017

Related U.S. Application Data

(63) Continuation of application No. PCT/FI2015/050823, filed on Nov. 25, 2015.

(30) Foreign Application Priority Data

Dec. 12, 2014 (FI) ...................................... 20146093

(51) Int. Cl.
*H02J 7/02* (2016.01)
*B60L 11/18* (2006.01)
(Continued)

(52) U.S. Cl.
CPC ........... *B60L 11/1816* (2013.01); *B60L 53/11* (2019.02); *B60L 53/14* (2019.02); *B60L 53/18* (2019.02);
(Continued)

(58) Field of Classification Search
CPC ... H02J 7/022; B60L 11/1816; B60L 11/1824; B60L 5/36
(Continued)

(56) References Cited

U.S. PATENT DOCUMENTS 5,003,453 A 3/1991 Tighe et al.
2008/0180058 A1 7/2008 Patel et al.
(Continued)

FOREIGN PATENT DOCUMENTS

DE 10 2011 010 227 A1 8/2012
DE 10 2013 102 576 A1 9/2014
(Continued)

OTHER PUBLICATIONS

International Search Report (PCT/ISA/210) dated Feb. 4, 2016, by the Japanese Patent Office as the International Searching Authority for International Application No. PCT/FI2015/050823. (5 pages).
(Continued)

*Primary Examiner* — Edward Tso
*Assistant Examiner* — Aaron Piggush
(74) *Attorney, Agent, or Firm* — Buchanan Ingersoll & Rooney PC

(57) ABSTRACT

A charging device is disclosed for charging an accumulator of a vehicle from a source of electrical energy, the charging device being configured to be integrated into the vehicle. The charging device includes at least two power units connectable to available phases of the source of electrical energy, the power units having at least partly same kind of power electronics of switched-mode technology to operate the power units, and structure for cooling the power electronics.

18 Claims, 2 Drawing Sheets

Figure 1:
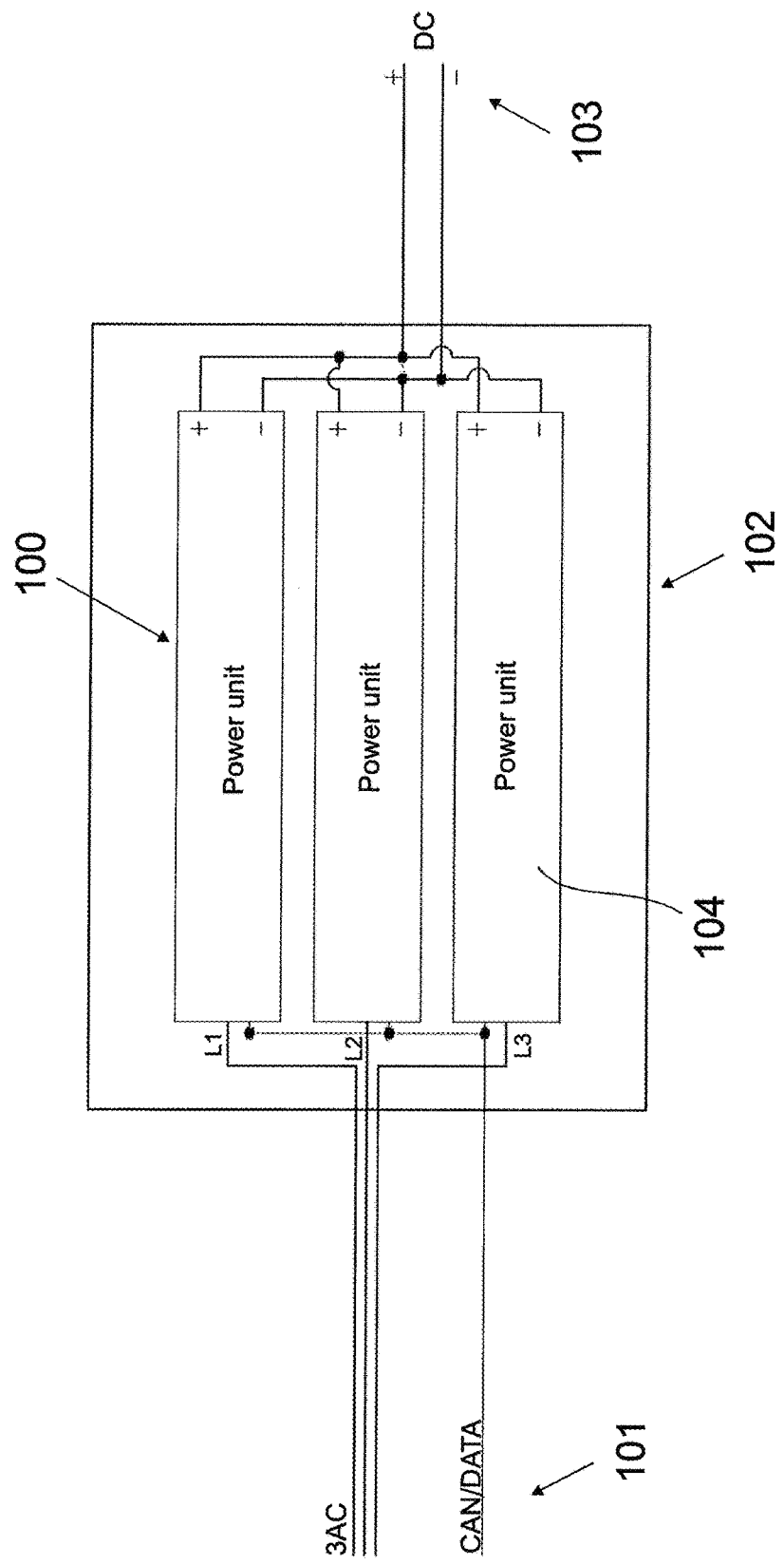

(51) Int. Cl.
*H02J 1/10* (2006.01)
*B60L 53/14* (2019.01)
*B60L 53/30* (2019.01)
*B60L 53/10* (2019.01)
*B60L 53/18* (2019.01)
*B60L 53/53* (2019.01)

(52) U.S. Cl.
CPC ............... *B60L 53/30* (2019.02); *B60L 53/53* (2019.02); *H02J 1/102* (2013.01); *H02J 7/022* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
USPC ......................................... 320/108, 109, 137
See application file for complete search history.

(56) References Cited

U.S. PATENT DOCUMENTS

| | | |
|---|---|---|
| 2012/0025759 A1 | 2/2012 | Kressner |
| 2012/0146581 A1 | 6/2012 | Tu |
| 2013/0134935 A1 | 5/2013 | Maitre et al. |
| 2013/0314038 A1* | 11/2013 | Kardolus ............ B60L 11/1812 320/109 |
| 2014/0062394 A1 | 3/2014 | Khan et al. |
| 2016/0121740 A1 | 5/2016 | Zaki |

FOREIGN PATENT DOCUMENTS

| | | | |
|---|---|---|---|
| DE | 10 2013 007 971 A1 | 11/2014 | |
| EP | 2 479 059 A1 | 7/2012 | |
| EP | 2 657 063 A1 | 10/2013 | |
| WO | WO 02/095917 A2 | 11/2002 | |
| WO | WO 2012/128626 A1 | 9/2012 | |

OTHER PUBLICATIONS

Written Opinion (PCT/ISA/237) dated Feb. 4, 2016, by the Japanese Patent Office as the International Searching Authority for International Application No. PCT/FI2015/050823. (6 pages).

Notification of Transmittal of the International Preliminary Report on Patentability (PCT/IPEA/416), dated Apr. 19, 2017, by the European Patent Office as the International Searching Authority for PCT/FI2015/050823. (8 pages).

Finnish Search Report dated Jun. 15, 2015, by the Finnish Patent and Registration Office for Finnish Patent Application No. 20146093. (2 pages).

Finnish Office Action dated Nov. 22, 2016, by the Finnish Patent and Registration Office for Finnish Patent Application No. 20146093. (6 pages).

Response to the Written Opinion dated Feb. 4, 2016, by Leitzinger to the European Patent Office, dated Oct. 11, 2016, for PCT/FI2015/050823. (11 pages).

Response to the Written Opinion dated Feb. 15, 2017, by Leitzinger to the European Patent Office, dated Mar. 27, 2017, for PCT/FI2015/050823. (5 pages).

Aravind Pothana et al., "Parallel Operation of Power Factor Corrected AC-DC Converter Modules With Two Power Stages," Power Electronics and Drive Systems, 2007, PEDS 2007, $7^{th}$ International Conference on, IEEE, Piscataway, NJ, USA, Nov. 27, 2007, pp. 953-960. (8 pages).

Iknur çolak et al., "High Current, Low Voltage Modular Power Converter for Lead Acid Battery Charging," Sustainable Energy Technologies, 2008, ICSET 2008, IEEE International Conference on, IEEE, Piscataway, NJ, USA, Nov. 24, 2008, pp. 1042-1046. (5 pages).

\* cited by examiner

METHOD AND ARRANGEMENT FOR CHARGING OF VEHICLE ACCUMULATORS

FIELD

Vehicles using electrical energy for moving are becoming more and more common as an environmental friendly vehicle technology.

BACKGROUND INFORMATION

Challenges of known charging procedures of electric vehicles (e.g., cars), relate to operation range, which can for example be limited to 100 km-200 km, and to long charging time, which is from 3 to 12 hours to charge the vehicle accumulators essentially to full charge. Known embodiments tried to shorten the long charging time by large grid interfaces such as utility power three-phase interfaces, which are generally available within households. However, for charging at home, at office or at a public charging station there are available only slow single-phase options. In known embodiments it has also been tried to shorten charging times by high loading power levels. These embodiments exhibit high temperature, and even ignition risks.

In known embodiments serious kinds of failure arise when the grid, i.e. the electrical network, loses one or more phases from operation. Known three-phase devices must identify the problem situation, shut down and disconnect from the network for the period of the malfunction and return to operation once the fault has been removed. During a grid malfunction the device cannot be used and the charging time is extended even by a ratio of 1:1 with the length of the malfunction (e.g., one hour malfunction causes a one hour extension of charging time). Malfunction of the grid described above may also damage known three-phase devices or even cause a fire.

Patent application document EP2657063 A1 presents a charging device which has conductive and inductive energy transmission interfaces that are connected to an energy storage-side terminal through electric power paths. The embodiments of EP2657063 A1 use several transforming stages causing considerable power losses.

Further, the patent application EP2479059 A1 describes a battery charger for electric vehicles.

SUMMARY

A charging device is disclosed for charging an accumulator of a vehicle from a source of electrical energy, the charging device being configured to be integrated into the vehicle, the charging device comprising: two or more power units configured to be connectable to available phases of a source of electrical energy, said power unit connections being made to a neutral point, the power units having at least partly a same kind of power electronics of switched-mode technology to operate the power units; and means for cooling said power electronics, an output side of the charging device being configured to be parallel connected.

A vehicle is disclosed comprising: an accumulator; and a charging device for charging an accumulator of the vehicle from a source of electrical energy, the charging device being configured to be integrated into the vehicle, the charging device comprising: two or more power units configured to be connectable to available phases of a source of electrical energy, said power unit connections being made to a neutral point, the power units having at least partly a same kind of power electronics of switched-mode technology to operate the power units; and means for cooling said power electronics, an output side of the charging device being parallel connected.

BRIEF DESCRIPTION OF THE DRAWING FIGURES

FIG. 1 presents an exemplary charging device structure according to the present disclosure.

Figure 2:
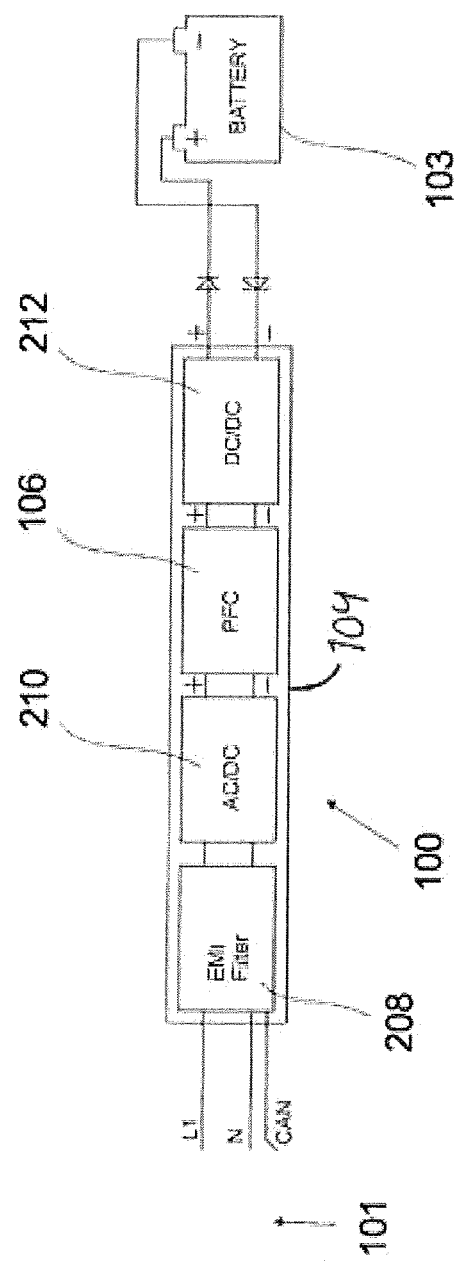

FIG. 2 presents an exemplary power unit structure according to the present disclosure.

DETAILED DESCRIPTION

An improved charging of accumulators of vehicles is disclosed, which charging can be performed fast and reliably from different kind of sources of electrical energy. This can be achieved by a charging device for charging an accumulator of a vehicle from a source of electrical energy, the charging device being integrated into the vehicle. The charging device can include at least two power units connectable to available phases of the source of electrical energy, the power units having at least partly same kind of power electronics of switched-mode technology to operate the power units, and means for cooling said power electronics.

Exemplary embodiments are based on utilization of at least partly same power electronics having switched-mode technology to operate at least two power units connectable to available phases of a source of electrical energy, and on utilization of means for cooling said power electronics.

The embodiments disclosed here can provide technically reliable and energy efficient solutions to charge vehicle accumulators resulting in essentially shortened charging time and in possibility to utilize the optimum charging power where electrical power is made available. The charging device according to the present embodiments can also be built small in size and light weighted with use of less materials than in known charging devices.

In the embodiments according to the present disclosure the charging device can be integrated into the vehicle, e.g. into an electric car or a hybrid car or some other electric or hybrid vehicle. In the disclosure exemplary embodiments can use energy-efficient switched-mode technology to achieve high efficiency of the charging throughout the power range, i.e. temperature levels do not rise too high even though loading process can be fast. These high-efficiency power electronics components enable that the charging device can be assembled into the electric car compactly since waste heat is generated only in small amounts. Due to smaller power losses, i.e. waste heat, smaller cooling element or elements can be used. The charging device can therefore be built smaller and lighter with use of less material.

In the future, devices such as electronics connected to the power grid and reactive load due to charging of electric cars take their toll on the power grid and its stability. Electrical network failures increase as the variety of electrical devices increases. The stability of the electricity grid is first and foremost a safety factor and enables our society to function effectively. In particular, the reactive power is predicted to cause problems in the future due to a growing number of electric cars charged from the grid, i.e. from the electric network. This is taken into account in the embodiments according to the present disclosure, which offer good reliability even in the case of a malfunction in the grid or a failure in the device itself. One or more phases dropping out will not cause any dangerous situation, and the charging device will continue to operate with a reduced output. Due to the parallel connection of the output side of the charging device single-phase charging can be performed without reduced efficiency when more powerful three-phase charging is not available. Thus, in the embodiments according to the present disclosure there is no need for an extra power unit to perform single-phase charging, which can considerably reduce the number of components needed and the cost of manufacturing.

FIG. 1 presents an exemplary charging device according to the present disclosure. The charging device is assembled, into a vehicle, i.e. an electric car, and it charges an accumulator 103 (i.e. rechargeable battery, traction pack, power pack, etc.) of the electric car from a source 101 of electrical energy, which is most often electrical network. The charging device can include at least two power units 104 being connectable to available phases of the source 101 of electrical energy. The power units 104 can include at least partly a same kind of power electronics 100 of switched-mode technology to operate the power units 104, and means 102 for cooling said power electronics 100. The power electronics 100 of switched-mode technology can include, for example, chopper circuit electronics or some other switched-mode electronics.

The output side of each power unit can be connected in parallel or in series in order to achieve a higher charging voltage for high-voltage batteries. When connecting the outputs in series, one must pay attention to the power units' isolation properties to withstand voltage in order to avoid possible breakdowns. A serial connection provides the same charging power and compensation of reactive power as above, but some of the advantages of the parallel connection are lost. When there is only a single-phase connection available all inputs of the power units have to be connected in parallel to the same phase with a suitable socket or with contactors or with a switch. In the single phase situation, charging current has to be reduced to fit the supply connection in order not to overload the network interface. In the embodiments according to the present disclosure the charging current, i.e. charging power, can be determined in the charging station, either automatically with identification of the plug used or by the user.

In an exemplary embodiment of the present disclosure, the charging device can include three same kinds of power units 104, which can be connected to three phases of the source 101 of electrical energy, each power unit 104 being connected to its individual phase. The power units 104 can be different e.g. in power characteristics, but an exemplary embodiment the power units are identical. Using the three-phase embodiment even 67% improvement in charging time, i.e. shortening of charging time, can be achieved compared to known embodiments. The biggest improvement by using the three-phase embodiment according to the present disclosure can be achieved compared to one phase embodiments.

In an exemplary embodiment according to the present disclosure the charging device can include at least two power units 104 being in parallel connection on the output side of the power units 104. It is possible to connect more than one power unit to each phase using a parallel connection. This depends on the type of the power grid and on the desired charging power. A charging device according to present disclosure can also be connected to a single phase when there is no three-phase connection available. A simpler structure is thus achieved compared to known embodiments, in which are used separate components and power units in single-phase and three-phase charging.

The means 102 for cooling can include at least one cooling element to transfer heat away from power electronics 100. The cooling element or multiple elements transfer the waste heat away from components and can be made of heat conductive materials such as aluminum. In another embodiment the means 102 for cooling can include cooling liquid to transfer heat away from power electronics 100. When using liquid cooling, the benefits listed above particularly regarding weight and volume can be improved. Also with liquid cooling, the device can be installed anywhere in the car because the heat exchange can take place outside the device itself.

In an exemplary embodiment according to the present disclosure the power electronics 100 includes a correction circuitry 106 for correcting reactive currents in order to minimize interferences to the source 101 of electrical energy, i.e. to the electrical network. The correction circuitry 106 can be a power factor correction (PFC) circuitry 106 which is connected to each power unit 104. Switch-mode technology is known to cause interference to the network. The resulting reactive current is most effectively compensated by the device itself by using e.g. an integrated Electromagnetic Interference (EMI)-filter and with so-called Power-Factor-Correction circuit (PFC). These circuits compensate the reactive current, narrowband and broadband interference that could cause problems to the electrical network or to other devices. With this a device PFC coefficient of even more than 0.99 can be reached. The PFC circuit allows the device to operate without increasing reactive current of the network. This can improve the power grid stability when widely used. The PFC is connected to each unit. This arrangement ensures minimal reactive currents will be produced over a full power range under normal conditions and even during network failures.

FIG. 2 presents an exemplary power unit structure according to the present disclosure. The exemplary power unit 104 includes as the power electronics 100 a filtering stage 208, rectifier (AC/DC) stage 210, power factor correction (PFC) circuitry 106, and a DC/DC stage 212. The power unit connections have been made to a neutral point, i.e. to a neutral conductor. The power unit 104 is connected to the accumulator 103 (i.e. rechargeable battery) to be charged.

In exemplary embodiments according to the present disclosure charging device output power can be adjustable between 0-100% using the communications bus, e.g. Control Area Network (CAN) which is a well-known and a common method of communication with e.g. the battery management system (BMS), or any other system controlling the device. If the device does not receive operating commands from the bus at regular intervals, the device turns itself off and waits for commands to start again. The lack of instructions can result in e.g. the BMS malfunctioning, or in any other control device malfunction. With the described arrangement there is no situation in which the device could charge the battery without the control system, and dangerous situations, e.g. a fire situation, can be avoided.

In the following is described a detailed exemplary embodiment according to the present disclosure. Commonly households in Europe have utility connection of 3*25 A 230 VAC volts at someone's disposal. This is the smallest available connection that households can have. For this case the best way to utilize the exemplary embodiment is to use its three-phase charging option for faster charging. Usually households have one or more three-phase sockets available. Most commonly these sockets are rated for 16 amperes per phase. In this exemplary embodiment the disclosure is built with three power units for max 16 amperes input each to utilize most of the current the socket can deliver. Each is connected to separate phases of the grid. When the grid is functioning correctly each power unit is, for example, consuming 16 amperes at 230 VAC. Total power being 3*16 A*230V=11 040 W or roughly 11 kW of power. With 95% efficiency it means roughly 10.5 kW of charging power is supplied into the battery. Maximum input current can be different from 16 A but it is used as an example because it is the most common limit for household sockets. Limiting power demand on 16 amperes per phase, won't load the 3*25 amperes connection fully and making normal electricity usage possible during charging.

In exemplary described embodiments according to the present disclosure a need to monitor the operation of the charging device by the user can be avoided. The charging device can also overcome the problems with electrical network failures without a danger to surroundings, the property, the electrical network, the battery, the car in general, or to the device itself. In addition, the charging device can be compatible with different types of power grids where (e.g. USA, Europe) exist different mains voltages and/or frequencies. Furthermore the charging device can be built small, lightweight and sturdily structured to fit in a passenger car or other type of vehicle without losing luggage or cargo space or without adding too much weight to the car. Lighter vehicles consume less energy while driving and achieve thus a longer driving range without increasing the size of the traction pack. In addition, the appliance of the disclosure has other consumer benefits through energy efficiency such as shortened charging times and even financial savings when customers can charge the whole pack full on those few hours when energy is cheaper.

Structures of the disclosure are not limited to examples in figures. For example, power unit(s) with means of cooling can be installed separately from other power unit(s). Every power unit can be located separately from one another with proper cooling without any effect on operation of the device. The charging device can be operated with any amount of connected phases desired to be used in the charging process according to embodiments of the present disclosure.

Thus, it will also be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A charging device for charging an accumulator of a vehicle from a source of electrical energy, the charging device being configured to be integrated into the vehicle, the charging device comprising:
   two or more power units configured to be connected to available phases of a source of electrical energy, wherein each power unit is configured to maintain a connection to an available phase regardless of a number of the available phases of the source of electrical energy, the power unit connections of each of the two or more power units are configured to be made to a neutral point, and the power units have power electronics of switched-mode technology to operate the power units; and
   means for cooling said power electronics, an output side of the charging device being configured to be parallel connected.

2. A charging device according to claim 1, wherein the source of electrical energy is an electrical network.

3. A charging device according to claim 1, wherein the charging device comprises:
   three power units configured to be connected to three phases of the source of electrical energy, each power unit being connected to its individual phase.

4. A charging device according to claim 1, wherein the charging device comprises:
   at least two power units in parallel connection on the output side of the power units.

5. A charging device according to claim 1, wherein the means for cooling comprise:
   at least one cooling element to transfer heat away from power electronics.

6. A charging device according to claim 1, wherein the means for cooling comprise:
   cooling liquid to transfer heat away from the power electronics.

7. A charging device according to claim 1, wherein the power electronics comprises:
   a correction circuitry for correcting reactive currents in order to minimize interferences to the source of electrical energy.

8. A charging device according to claim 7, wherein the correction circuitry is a power factor correction (PFC) circuitry which is connected to each power unit.

9. A charging device according to claim 1, wherein the power units are identical.

10. A vehicle comprising:
    an accumulator; and
    a charging device for charging an accumulator of the vehicle from a source of electrical energy, the charging device being configured to be integrated into the vehicle, the charging device comprising:
       two or more power units configured to be connected to available phases of a source of electrical energy, wherein each power unit is configured to maintain a connection to an available phase regardless of a number of the available phases of the source of electrical energy, the power unit connections of each of the two or more power units are configured to be made to a neutral point, and the power units have power electronics of switched-mode technology to operate the power units; and
       means for cooling said power electronics, an output side of the charging device being parallel connected.

11. A vehicle according to claim 10 wherein the source of electrical energy is an electrical network.

12. A vehicle according to claim 10 wherein the charging device comprises:
    three power units configured to be connected to three phases of the source of electrical energy, each power unit being connected to its individual phase.

13. A vehicle according to claim 10 wherein the charging device comprises:
    at least two power units in parallel connection on the output side of the power units.

14. A vehicle according to claim 10 wherein the means for cooling comprise:
    at least one cooling element to transfer heat away from power electronics.

15. A vehicle according to claim 10, wherein the means for cooling comprises:
    cooling liquid to transfer heat away from power electronics.

16. A vehicle according to claim 10 wherein the power electronics comprises:
   a correction circuitry for correcting reactive currents in order to minimize interferences to the source of electrical energy.

17. A vehicle according to claim 10 wherein the correction circuitry is a power factor correction (PFC) circuitry which is connected to each power unit.

18. The vehicle according to claim 10, wherein the power units are identical.

* * * * *